(12) United States Patent
Menheere (10) Patent No.: US 11,255,213 B2
(45) Date of Patent: Feb. 22, 2022

(54) SHROUD ASSEMBLY FOR CENTRIFUGAL COMPRESSOR AND METHOD

(71) Applicant: PRATT & WHITNEY CANADA CORP., Longueuil (CA)

(72) Inventor: Dave Menheere, Norval (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 211 days.

(21) Appl. No.: 16/511,185

(22) Filed: Jul. 15, 2019

(65) Prior Publication Data

US 2021/0017876 A1    Jan. 21, 2021

(51) Int. Cl.
*F01D 11/18* (2006.01)
*F04D 29/62* (2006.01)
*F04D 29/42* (2006.01)

(52) U.S. Cl.
CPC ............ *F01D 11/18* (2013.01); *F04D 29/622* (2013.01); *F04D 29/4206* (2013.01); *F05D 2220/32* (2013.01)

(58) Field of Classification Search
CPC ........ F02C 3/08; F04D 29/083; F04D 29/162; F04D 29/624; F04D 29/622; F04D 29/4206; F01D 11/18; F05D 2220/32
See application file for complete search history.

(56) References Cited

U.S. PATENT DOCUMENTS

| | | | |
|---|---|---|---|
| 4,687,412 A * | 8/1987 | Chamberlain | ...... F04D 29/4206 415/134 |
| 8,105,012 B2 | 1/2012 | Anema | |
| 9,683,488 B2 * | 6/2017 | Ress, Jr. | ................... F02C 3/08 |
| 9,726,032 B2 * | 8/2017 | Ress, Jr. | ............... F01D 11/005 |
| 2017/0276355 A1 * | 9/2017 | Sander | ................... F01D 25/246 |
| 2017/0342996 A1 | 11/2017 | Nesteroff et al. | |
| 2017/0343002 A1 | 11/2017 | Ottow et al. | |

* cited by examiner

*Primary Examiner* — Woody A Lee, Jr.
*Assistant Examiner* — Maxime M Adjagbe
(74) *Attorney, Agent, or Firm* — Norton Rose Fulbright Canada LLP (57) ABSTRACT

The centrifugal compressor can have a shroud engaged to a case via a plurality of circumferentially interspaced slots and lugs, the slots extending in at least one of a radial direction and an axial direction relative to a rotation axis of the compressor, the lugs slidingly received in a corresponding slot and configured for sliding in the slot in response to thermal growth of the case relative to the shroud.

18 Claims, 6 Drawing Sheets

SHROUD ASSEMBLY FOR CENTRIFUGAL COMPRESSOR AND METHOD

TECHNICAL FIELD

The application relates to shroud assemblies for centrifugal compressors for gas turbine engines.

BACKGROUND OF THE ART

While prior art shroud assemblies for centrifugal compressors may be suitable for their intended purposes, improvements in aviation technologies are always desirable.

SUMMARY

In one aspect, there is provided a shroud engaged to a case via a plurality of circumferentially interspaced slots and lugs, the slots extending in at least one of a radial direction and an axial direction relative to a rotation axis of the compressor, the lugs slidingly received in a corresponding slot and configured for sliding in the slot in response to thermal growth of the case relative to the shroud.

In another aspect, there is provided: a gas turbine engine, comprising: in serial flow communication, a compressor section and a turbine section rotatable about a rotation axis, the compressor section including: a centrifugal rotor rotatable about the rotation axis and having blades extending generally radially from the hub, the rotor supported within a case; a shroud disposed around the blades; and a plurality of slots and mating lugs connecting the case to the shroud configured to allow for relative movement of the case and shroud in at least one of: an axial direction, and a radial direction in response to thermal growth within the compressor section.

In another aspect, there is provided a method of constructing a gas compressor having centrifugal flow blades rotatable about a rotation axis, comprising: defining a plurality of lugs on one of a case portion and a shroud of the gas compressor; defining a plurality of slots in the other one of the case portion and the shroud of the gas compressor for sliding fit with corresponding ones of the lugs in at least one of: a radial direction and an axial direction; inserting the lugs into corresponding ones of the slots; disposing the case portion and the shroud at least in part over at least some of the centrifugal flow blades coaxially with the rotation axis to define an airflow path through the gas compressor; and engaging the case portion and the shroud with a rest of the gas compressor.

DESCRIPTION OF THE DRAWINGS

Reference is now made to the accompanying figures in which.

DETAILED DESCRIPTION

While the shroud assembly technology of the present document is described herein with respect to a particular aircraft engine, the shroud assembly technology may likewise be used with other types of aircraft engines, other types of gas turbine engines and/or other types of centrifugal compressors. Axial (XA), radial (XR) and circumferential (XC) directions as referred to in the present document are shown with corresponding arrows in the figures.

Figure 1:
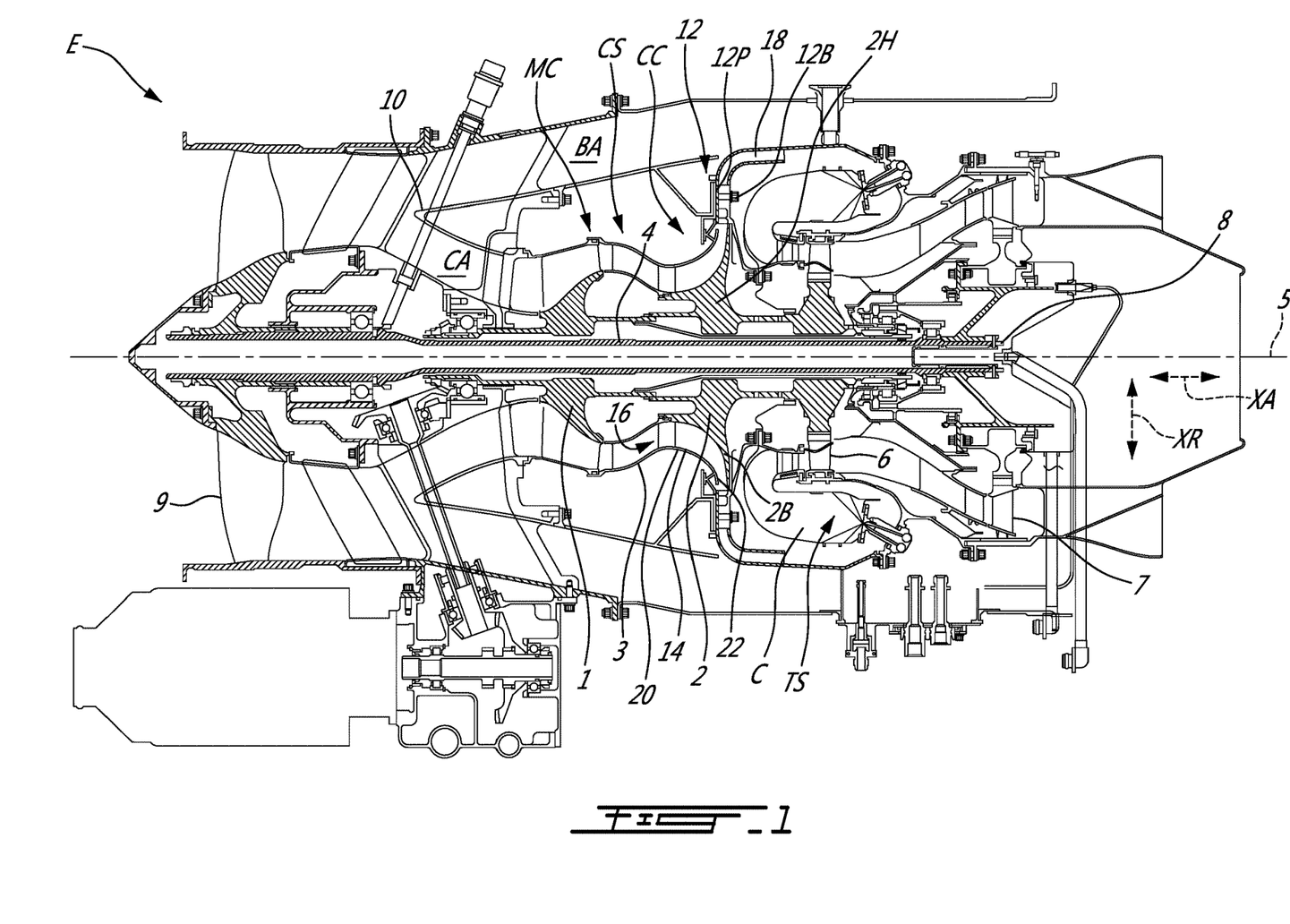
FIG. 1 is a schematic cross section side view of an aircraft engine.

FIG. 1 is an axial cross-section through a turbofan gas turbine engine (E) that includes in serial flow communication, a compressor section (CS), a combustor (C), and a turbine section (TS). In this embodiment, the compressor section (CS) includes mixed flow compressor (MC) having a mixed flow compressor rotor 1, and a centrifugal compressor (CC) a centrifugal compressor rotor 2 downstream of the mixed flow compressor (MM), and an intermediate duct 3 therebetween. The centrifugal compressor rotor 2 includes a centrifugal flow hub 2H that in this embodiment is mounted onto a high pressure shaft 4 for rotation about a rotation axis 5. The centrifugal flow hub 2H includes a circumferential array of centrifugal flow blades 2B extending radially and axially from the centrifugal flow hub 2. While a particular arrangement and shape of the blades 2B is shown and described herein, it is contemplated that any other suitable blade arrangement and/or shape may be used.

Similarly, while a particular compressor section (CS) is shown and described herein, it is contemplated that the centrifugal compressor and shroud technology described herein may be used in any other compressor section (CS) of an engine (E) and/or in a stand-alone centrifugal compressor for example. As a non-limiting example, in other embodiments, the compressor section (CS) may have one or more axial flow compressors having one or more axial flow compressor rotors instead of the mixed flow compressor rotor 1. As another non-limiting example, in other embodiments, the compressor section (CS) may not have a mixed flow compressor rotor 1 or an axial flow compressor rotor.

In the present embodiment, and although not necessarily the case in other embodiments, the mixed flow rotor 1 and the centrifugal flow rotor 2 are mounted at their respective hubs to the high pressure shaft 4 and rotate about the rotation axis 5. In the present embodiment, the turbine section (TS) includes a high pressure turbine 6 that drives the high pressure shaft 4 and the compressor rotors 1 and 2 about the rotation axis 5. Further in the present embodiment, turbine section (TS) includes a low pressure turbine 7 that drives a low pressure shaft 8 with a forward mounted fan 9. As a non-limiting example, in other embodiments, the gas turbine engine (E) may have a different output architecture, such as a gear reducer/main drive instead of the fan 9, and/or a different turbine section (TS) architecture.

Still referring to FIG. 1, in this embodiment, a bypass flow splitter 10 splits airflow ingested by the fan 9 into a bypass airflow path (BA) and a core airflow path (CA). As shown, the core airflow path (CA) is defined in part by the compressor section (CS), and more particularly in part by the centrifugal compressor (CC). During operation, air flowing through the core airflow path (CA) is compressed in the compressor section (CS) before being delivered into the combustor (C) for generating the exhaust gases that then power the turbines 6, 7.

In this embodiment, the compressor section (CS) includes a case 12 at least a portion of which is shaped to be, and is, when the centrifugal compressor (CC) is assembled, disposed around the centrifugal compressor rotor 2. More particularly, and now referring to both FIG. 1 and FIG. 2, the case 12 includes a case portion 12P which is attached to a rest of the case 12 via a plurality of bolts 12B (FIG. 1). As shown in FIG. 1, the case portion 12P is annular and is disposed at least in part over the centrifugal compressor rotor 2, coaxially with the centrifugal compressor rotor 2.

The bolts 12B extend through the case portion 12P and into corresponding parts of the rest of the case 12 at locations that are distributed circumferentially around the case portion 12P. The bolts 12B are one example of a fastener that may be used to attach the case portion 12P to the rest of the case 12. In other embodiments, the case portion 12P may be attached to the rest of the case 12 via other fasteners, or via a different type of attachment mechanism for example. In some embodiments, the case portion 12P may be integral to the rest of the case 12 and/or to a different part of the case 12.

Figure 2:
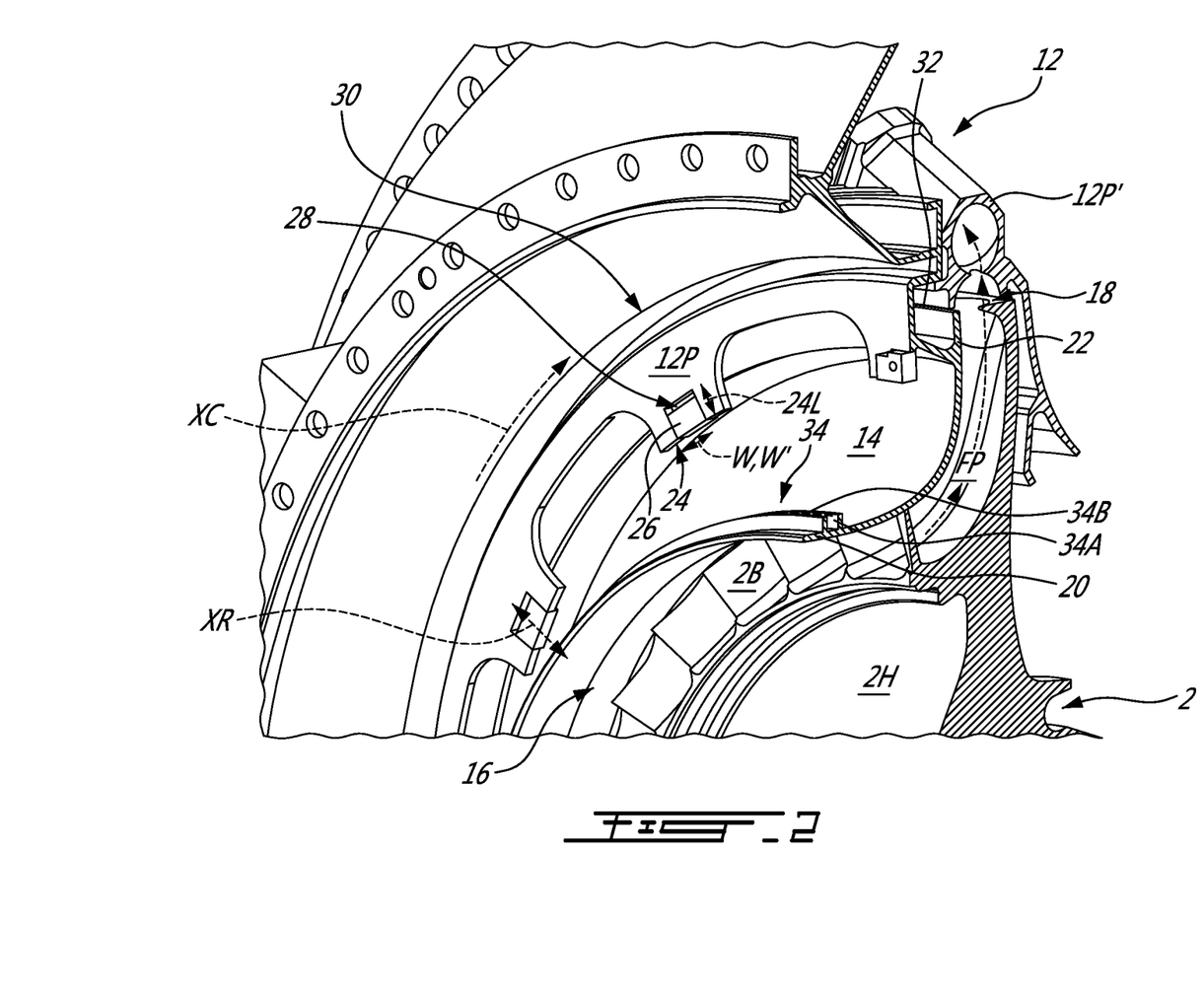
FIG. 2 is a perspective view of a section taken through a shroud assembly of the engine of FIG. 1.

Now referring to FIGS. 1 and 2, the centrifugal compressor (CC) further includes a shroud 14. The case portion 12P and the shroud 14 define an airflow path (FP) through the centrifugal compressor (CC), which in this embodiment is part of the core airflow path (CA). More particularly, the shroud 14 is shaped to be, and is, when the centrifugal compressor (CC) is assembled, disposed at least in part over the centrifugal compressor rotor 2, as shown in FIG. 1. In this embodiment, the shroud 14 is annular and defines at least in part an inlet 16 and an outlet 18 of the centrifugal compressor (CC).

In this particular embodiment, the inlet 16 and the outlet 18 are annular. In this particular embodiment, the inlet 16 is fluidly connected to the intermediate duct 3 to receive air therefrom during operation of the engine (E), although a different flow-receiving arrangement may likewise be used. In this particular embodiment, the outlet 18 is shaped to act as a diffuser, although a different shape and/or type of outlet may be used in other embodiments.

During operation of the centrifugal compressor (CC), air flowing into the inlet 16 of the centrifugal compressor (CC) is at a lower pressure than air leaving the outlet 18. Therefore, the portion of the shroud 14 defining the inlet 16 is referred to herein as a low pressure portion 20 of the shroud 14, and the portion of the shroud 14 defining the outlet 18 is referred to herein as a high pressure portion 22 of the shroud 14.

In the present embodiment, the shroud 14 is engaged with the case portion 12P, and therefore with the case 12, at the high pressure portion 22 via circumferentially interspaced slots 24 and lugs 26. In the present embodiment, the slots 24 are defined in, and distributed circumferentially around, the case portion 12P. In other embodiments, one or more of the slots 24 may be defined in the shroud 14 and one or more lugs 26 may be defined by the case portion 12P. In the present embodiment, the lugs 26 are defined by the shroud 14 and are distributed circumferentially around the shroud 14 at locations corresponding to the slots 24. In the present embodiment, the lugs 26 extend in an axial direction (XA). In other embodiments, one or more of the lugs 26 may extend in a radial direction (XR).

In some such embodiments, the case portion 12P may define some slots 24 and some lugs 26, and the shroud 14 may define: a) lugs 26 corresponding to the slots 24 in the case portion 12P, and b) slots 24 corresponding to the lugs 26 in the case portion 12P. In other embodiments, one or more of the lugs 26 may be a different type of lug, such as one or more bolts connected to the shroud 14 for example. While in this embodiment the lugs 26 are integral to the shroud 14, in other embodiments and for example depending on the particular embodiment of the lugs 26, this need not be the case for some or all of the lugs 26.

As shown in FIG. 2, each of the slots 24 has a dimension, which in this embodiment is a length 24L, that extends radially (XR). More particularly, in the present embodiment, the length 24L of each of the slots 24 extends toward the rotation axis 5. This arrangement may provide advantages in some applications and/or aspects, such as for example helping to maintain the shroud 14 axially aligned (i.e. coaxial) with the rotation axis 5 when the engine (E) is in use and more particularly during thermal growth of the case portion 12P for example. However, in other embodiments, one or more of the slots 24 may have a different orientation relative to the rest of the shroud 14. It is noted that the case portion 12P may experience thermal growth relative to the shroud 14 during changes in operating conditions of the centrifugal compressor (CC) and/or the engine (E).

Still referring to FIG. 2, as shown, the lugs 26 are attached to (in this embodiment by being integral with) and extend from the high pressure portion 22 of the shroud 14. The lugs 26 extend into, and are received in, corresponding ones of the slots 24.

In this embodiment, the slots 24 and the respective lugs 26 are shaped and sized such that the lugs 26 radially slidingly engage the slots 24 to help position the shroud 14 coaxially with the rotor 2 while preventing the shroud 14 from rotating or pivoting about the rotation axis 5 relative to the case 12 and while allowing for thermal expansion of the case portion 12P relative to the shroud 14. To this end, in this embodiment, the slots 24 and the lugs 26 are shaped and sized relative to each other to allow the lugs 26 to slide along the lengths 24L of the slots 24 during thermal growth of the case portion 12P.

In the present embodiment, the width (W) of each of the slots 24 may be selected to be slightly larger than a width (W') of the corresponding lug 26 to rotationally lock the shroud 14 relative to the case 12 while maintaining a sliding engagement between the slots 24 and the lugs 26 in a radial direction (XR). More particularly, in the present embodiment, the widths (W), (W') are selected such that each of the lugs 26 abuts both of two opposed sides, which in this embodiment are opposed lateral sides, of a corresponding one of the slots 24 (i.e. of the slot 24 in which that lug 26 is received), to slide relative to the opposed lateral sides in the radial direction (XR) of that slot 24 during thermal expansion of the case portion 12P. In an aspect, this abutment is in a circumferential direction (XC) and rotationally locks the shroud 14 relative to the case portion 12P and the rotation axis 5.

In some embodiments, one or more of the lugs 26 may be shaped to abut only one of the opposed lateral sides of a corresponding one of the slots 24 while providing for similar functionality. As an example, to this end, the width (W) of one or more of the slots 24 may be made larger than the width (W) of the corresponding lug(s) 26 such that the lug(s) 26 abut one but not both of the opposed lateral sides of the one or more of the slots 24 that define the width (W) of the one or more of the slots 24.

To help further improve absorption of thermal growth of the case 12, as shown in FIG. 2, each of the slots 24 is open radially toward the shroud 14. In an aspect, radially-inwardly open slots 24 may help provide a relatively longer range of possible relative radial (XR) movement between the case portion 12P and the lugs 26 during thermal growth of the case portion 12P. In another aspect, radially-inwardly open slots 24 may also help reduce a weight of the case portion 12P by allowing at least some material of the case portion 12P to be removed, such as at least some material that may otherwise be required radially inwardly of the lugs 26. In other embodiments, the slots 24 may be enclosed. In such embodiments, the slots 24 may be defined as apertures extending through the case portion 12P.

In another aspect, as shown in FIG. 2, in some embodiments the shroud 14 and the lugs 26 may be dimensioned such that during at least part of a time during which the centrifugal compressor (CC) is in use, such as for example when the centrifugal compressor (CC) driven in an idle steady state, each of the lugs 26 and a corresponding one of the slots 24 define a gap 28 between that lug 26 and that slot 24. As shown, the gap 28 may be at a radially outer end of the length 24L of that slot 24, and may be sized to accommodate for an expected magnitude of thermal growth of the case portion 12P. Accordingly, one or more of the gaps 28 may change in size during thermal growth of the case portion 12P relative to the shroud 14. In some cases, the gaps 28 may increase in size.

In other cases, the gaps 28 may decrease in size. In some embodiments, the gaps 28 may be sized sufficiently large such that the gaps 28 may decrease in size but are not eliminated at any point during an operational envelope for which the centrifugal compressor (CC) may be designed. In an aspect, this may allow for the case portion 12P to thermally grow relative to the shroud 14 while applying substantially no pushing forces to the shroud 14 in a radial direction (XR) and/or while applying no force to the shroud 14 that is sufficient to move the shroud 14 out of its coaxial alignment with the centrifugal compressor rotor 2. The slots 24 and the lugs 26 may thereby help maintain the shroud 14 coaxial with the centrifugal compressor rotor 2 during operation of the centrifugal compressor (CC) and/or may help reduce stresses experienced by the shroud 14.

It is contemplated that in some embodiments, and depending on the precision of the chosen manufacturing method for example, one or more of the gaps 28 may be sized such that at in a threshold thermally expanded state of the case portion 12P, one or more of the gaps 28 may be just closed/eliminated but without allowing the case portion 12P to apply a force on the shroud 14 in a radial direction (XR) that would move the shroud 14 out of its coaxial alignment with the centrifugal compressor rotor 2. Some such alternative embodiments may provide similar benefits as the present embodiment, but in some cases and depending on the application of the centrifugal compressor (CC) may require relatively more complex and/or precise manufacturing and/or assembly methods. In other embodiments, the gaps 28 may be omitted.

As shown in FIGS. 1 and 2, the case portion 12P and the shroud 14 are part of a shroud assembly 30. In this embodiment, the shroud assembly 30 further includes biasing members 32 disposed circumferentially about the rotation axis 5 between the shroud 14 and the rest of the case 12 and biasing the shroud 14 against the case portion 12P. More particularly, in the present embodiment, each biasing member 32 is a lever spring 32 that is integral to the shroud 14 and abuts a portion 12P' of the case 12 that defines a continuation of the outlet 18 of the centrifugal compressor (CC). In other embodiments, the biasing members 32 may include one or more different types of biasing member, such as a different type(s) of spring, and need not be integral to the shroud 14.

The axial engagement of the shroud 14 against the case portion 12P along the annular interface between the shroud 14 and the case portion 12P may help better define the airflow path (FP) through the centrifugal compressor (CC). The biasing may help reduce and/or eliminate air leakage that may otherwise occur out of the airflow path (FP) via the annular interface. Any suitable number of biasing member(s) 32 may be used to suit each particular embodiment of the centrifugal compressor (CC). In some embodiments, the biasing members 32 may be omitted.

Referring to FIG. 2, in this embodiment the low pressure portion 20 of the shroud 14 connects to the intermediate duct 3 via an attachment 34. In this embodiment, the attachment includes a circumferentially extending slot 34A defined by the low pressure portion 20 of the shroud 14 and a corresponding circumferentially extending lug 34B (shown schematically in FIG. 2) defined by a corresponding part of the intermediate duct 3 and received in the slot 34. While the attachment 34 may provide advantages in some applications, a different type of attachment 34, and/or an attachment of the low pressure portion 20 to a different part of the engine (E), may be used. In some embodiments, the intermediate duct 3 and/or the other part of the engine (E) may be part of the case 12.

Figure 3:
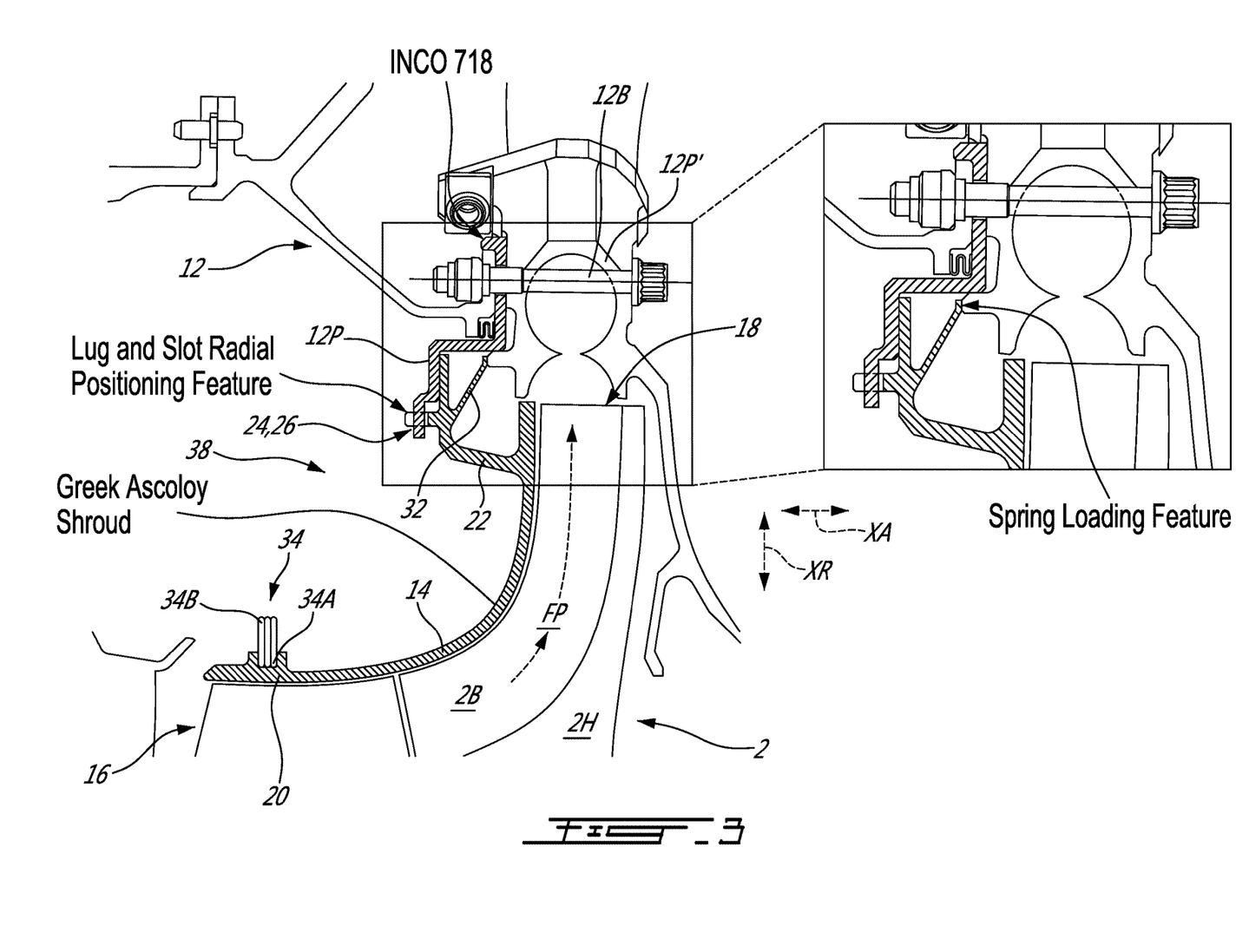
FIG. 3 is a section view taken through another embodiment of the shroud assembly of FIG. 2.

Now referring to FIG. 3, a shroud assembly 38 is shown. The shroud assembly 38 is a different embodiment of the shroud assembly 30. The shroud assembly 38 is similar to the shroud assembly 30, and therefore the same reference numerals have been used to label parts of the shroud assembly 38 that correspond to parts of the shroud assembly 30. A difference between the shroud assembly 38 and the shroud assembly 30 is that the case portion 40P of the shroud assembly 38 includes an axial offset 42 that spaces the part of the case portion 40P defining the slots 24 from a corresponding parallel part of the shroud 14.

In some cases, the axial offset 42 may help reduce a complexity of manufacturing and/or assembly of the shroud assembly 38. Another difference between the shroud assembly 38 and the shroud assembly 30 is that the shroud assembly 38 includes one or more springs 44 disposed between one part 40A of the case 12 and the case portion 40P and biasing at least a part of the case portion 40P axially (XA) against the shroud 14.

Figure 4:
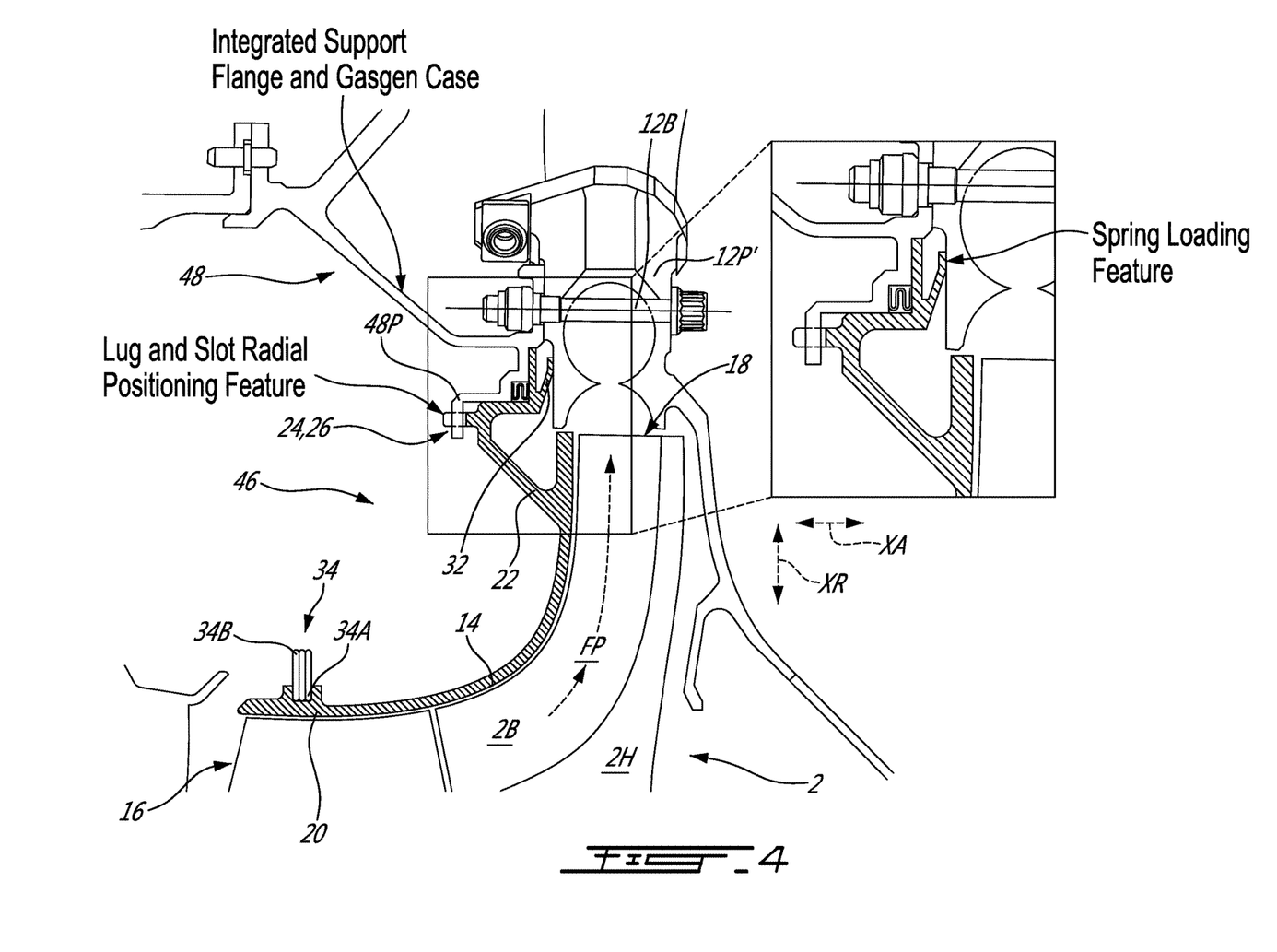
FIG. 4 is a section view taken through another embodiment of the shroud assembly of FIG. 2.

Now referring to FIG. 4, a shroud assembly 46 is shown. The shroud assembly 46 is a different embodiment of the shroud assembly 30. The shroud assembly 46 is similar to the shroud assembly 30, and therefore the same reference numerals have been used to label parts of the shroud assembly 46 that correspond to parts of the shroud assembly 30. A difference between the shroud assembly 46 and the shroud assembly 30 is that the case portion 48P of the shroud assembly 46 is integral to the rest of the case 48.

Figure 5:
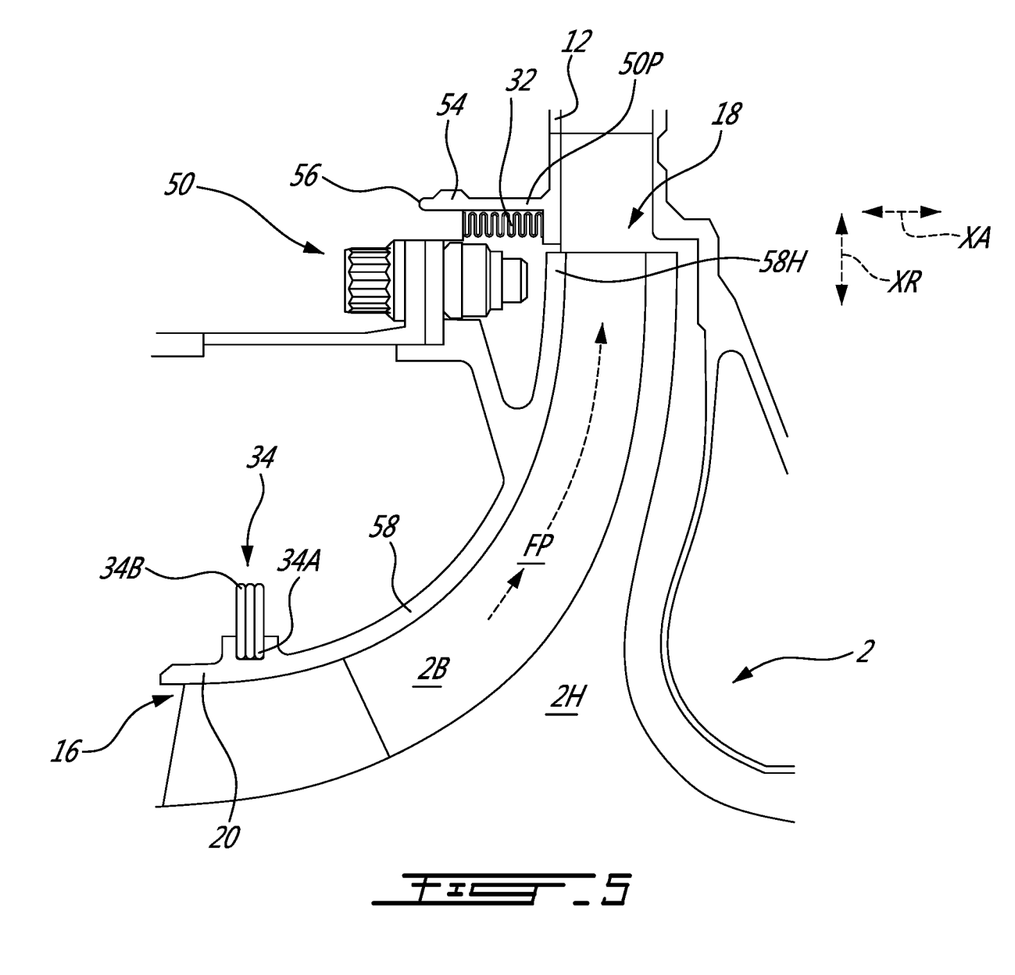
FIG. 5 is a section view taken through another embodiment of the shroud assembly of FIG. 2.
Figure 6:
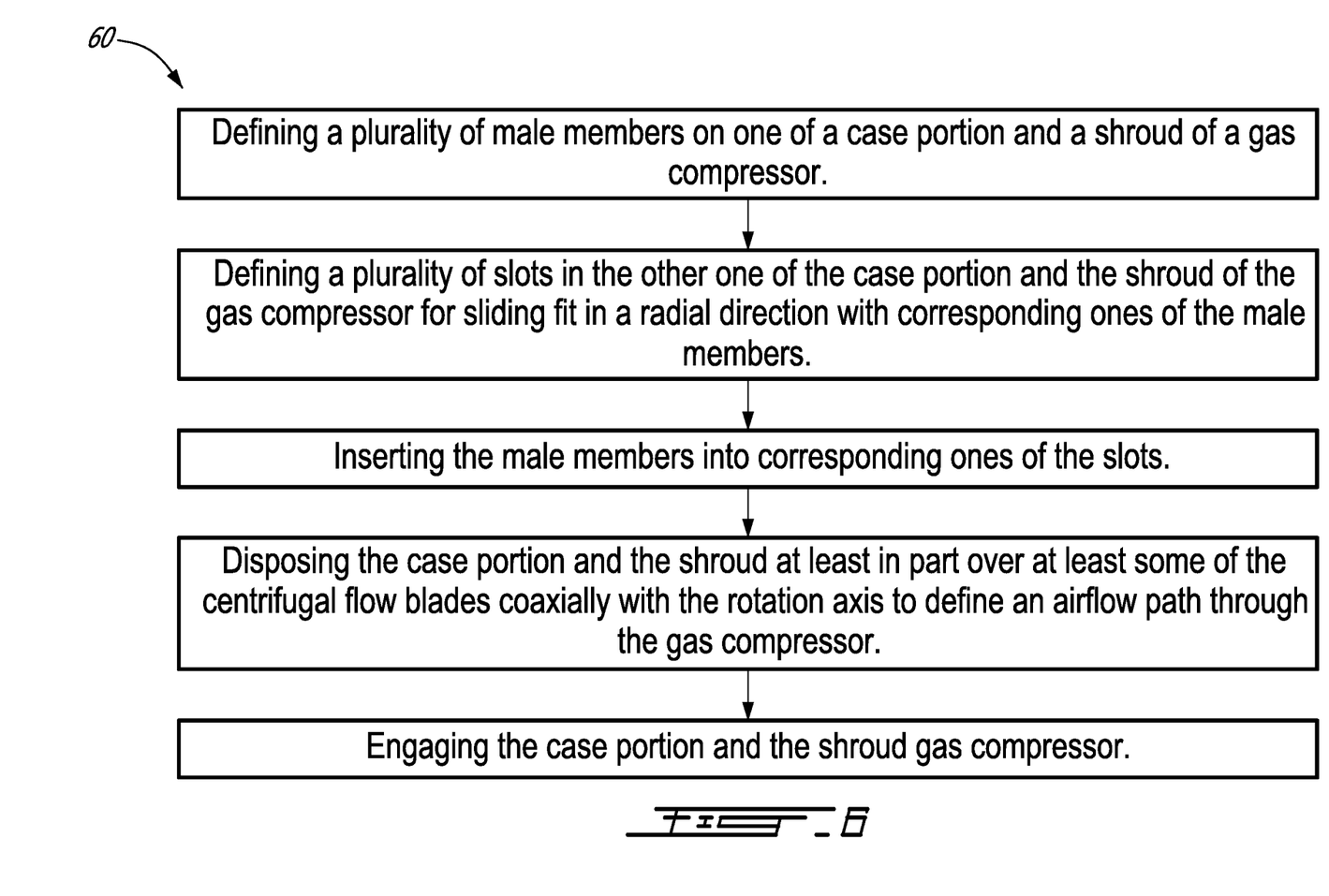
FIG. 6 is a diagram showing a method of constructing a gas compressor having centrifugal flow blades rotatable about a rotation axis.

Now referring to FIG. 5, a shroud assembly 50 is shown. The shroud assembly 50 is a different embodiment of the shroud assembly 30. The shroud assembly 50 is similar to the shroud assembly 30, and therefore the same reference numerals have been used to label parts of the shroud assembly 50 that correspond to parts of the shroud assembly 30. A difference between the shroud assembly 50 and the shroud assembly 30 is that the case portion 50P of the shroud assembly 50 is integral to the rest of the case 12 and instead of slots 24, defines the lugs 56. In this embodiment, the lugs 56 extend in an axial direction (XA) into corresponding ones of slots 54 defined in the shroud 58. As shown, the slots 54 are defined in portions of the high pressure portion 58H of the shroud 58 that extend in a radial direction (XR) outwardly from the rotation axis 5. Hence, in this embodiment, the dimension (D) of the slots 54 along which the lugs 56 are slidable during thermal growth of the lugs 56 is aligned with the axial direction (XA). Accordingly, it may be said that a predominant direction of thermal growth of the lugs 56 in this embodiment is the axial direction (XA). Yet another difference in this embodiment is that the shroud 58 abuts and is biased via the one or more springs 32 against a part of the case 12 which is different from the part of the case that defines the lugs 56. Also in this embodiment, the one or more springs 32 seal the interface between the slots 54 and the lugs 56 to limit or avoid air leakage from the airflow path (FP) via the interface.

While several non-limiting configurations of slots and lugs have been described herein, it is contemplated that other equivalent configurations of slots and lugs may be used to provide for similar functions. For example, in some configurations, the slots and lugs may be arranged for relative sliding movement in both axial (XA) and radial (XR) directions. As another example, in some configurations, the slots and lugs may be arranged for relative sliding movement in predominantly radial (XR) directions. As another example, in some configurations, the slots and lugs may be arranged for relative sliding movement in predominantly axial (XA) directions.

In summary, in the various embodiments described above, the engagement between the high pressure portion 22 of the shroud 14 and the case 12 of the centrifugal compressor (CC) may help radially position the shroud 14 while allowing for at least some thermal growth of the case 12 in at least one of a radial direction (XR) and an axial direction (XA), and while maintaining the coaxial arrangement of the shroud 14 relative to the centrifugal compressor rotor 2. In some such embodiments, the case portion 12P and the lugs 26 may be arranged and dimensioned relative to each other to provide the relative sliding movement in one of an axial direction (XA) and a radial direction (XR) while the lugs 26 may extend in the other one of the axial direction (XA) and the radial direction (XR).

In another aspect, and in at least some aircraft applications of the centrifugal compressor (CC), the engagement between the high pressure portion 22 of the shroud 14 and the case 12 according to the present technology may also help to reduce heat transfer between the case 12 and the shroud 14 in comparison with at least some prior art designs in which a shroud is fixed to a case.

In another aspect, and in at least some aircraft applications of the centrifugal compressor (CC), the engagement may also allow for the shroud 14 to be made of at least one material that may otherwise not be suitable for the at least some aircraft applications. More particularly, while the shroud 14 may be made of a different material in other variations of the embodiments described above, in the embodiments as described above the shroud 14 is made of Greek Ascoloy. The use of Greek Ascoloy to make the shroud 14 may help simplify manufacturing and/or may help improve some operating characteristics of the centrifugal compressor (CC). Also, while this need not be the case in other embodiments, in the embodiments as described above, the case 12, 48 is made of INCO 718. In some cases, an INCO 718 case 12, 48 in combination with a Greek Ascoloy shroud 14 may help simplify manufacturing and/or may help improve some operating characteristics of the centrifugal compressor (CC).

With the above structure in mind, and now referring to FIG. 5, the present technology provides a method 60 of constructing a gas compressor (CC) having centrifugal flow blades 2B rotatable about a rotation axis 5. In some embodiments, the method 60 may include defining a plurality of lugs 26 on one of a case portion 12P, 40P, 48P, 50P and a shroud 14 of the gas compressor (CC). In some embodiments, the method 60 may also include defining a plurality of slots 34 in the other one of the case portion 12P, 40P, 48P, 50P and the shroud 14 of the gas compressor (CC) for sliding fit with corresponding ones of the lugs 26 in at least one of: a radial direction (XR) and an axial direction (XA).

The method 60 may further include inserting the lugs 26 into corresponding ones of the slots 24, 54 and disposing the case portion 12P, 40P, 48P, 50P and the shroud 14 at least in part over at least some of the centrifugal flow blades 2B coaxially with the rotation axis 6 to define an airflow path (FP) through the gas compressor (CC). The method 60 may also include engaging the case portion 12P, 40P, 48P, 50P and the shroud 14 with a rest of the gas compressor (CC), such as for example by connecting a low pressure portion 20 of the shroud 14 to a duct 3 and/or to a part of the gas compressor (CC).

In some embodiments, the method 60 may also include biasing the shroud 14 against the case portion 12P, 40P, 48P, 50P for example in an axial direction (XA). In some embodiments, the method 60 may also include sizing, positioning and orienting the slots 24 relative to the lugs 26 to allow the slots 24, 54 to move relative to the lugs 26, 56 (or vice versa, depending on the point of reference) during thermal growth of the core portion 12P, 40P, 48P while applying substantially no pushing forces (as distinct from friction forces for example) to the lugs 26, 56 in a radial direction (XR).

In some embodiments, the method 60 may also include sizing, positioning and orienting the slots 24, 54 relative to the lugs 26 to engage the lugs 26, 56 with surfaces defining the slots 24, 54 in a circumferential direction (XC) when the lugs 26, 56 are inserted into corresponding ones of the slots 24, 54 to thereby prevent rotation of the shroud 14 about the rotation axis 5.

The various embodiments of the present technology described above may be made using conventional engineering principles and manufacturing techniques. The above description provides non-limiting examples. One skilled in the art will recognize that changes may be made to the embodiments described without departing from the scope of the technology disclosed herein. For example, while in some cases an engine (E) may be manufactured with the shroud technology described herein, in other cases an existing engine (E) may be retrofitted with the shroud technology described herein.

As another example, while the case 12 may be a case of the centrifugal compressor (CC) in some embodiments, in other embodiments the case 12 may be a part of the engine (E) in addition to or instead of being a case of the centrifugal compressor (CC). Likewise, the case 12 may be any suitable case and may have any suitable construction depending on each particular application and/or embodiment of the centrifugal compressor (CC) for example.

The invention claimed is:

1. A gas turbine centrifugal compressor comprising: a centrifugal rotor and a shroud engaged to a case via a plurality of circumferentially interspaced slots and lugs, the slots defined by one of the shroud and the case, the lugs defined by the other of the shroud and the case, the shroud supported radially relative to a rotation axis of the centrifugal rotor by an engagement of the lugs in the slots, the slots extending in at least one of a radial direction and an axial direction relative to a rotation axis of the compressor, the lugs slidingly received in a corresponding slot and configured for sliding in the slot in response to thermal growth of the case relative to the shroud, the shroud is disposed at least partially around the centrifugal rotor.

2. The gas turbine centrifugal compressor of claim 1, wherein at least some of the slots are defined in a case portion and at least some of the lugs are attached to the shroud, and a dimension is a length extending in the radial direction.

3. The gas turbine centrifugal compressor of claim 2, wherein the at least some of the slots are open radially toward the shroud.

4. The gas turbine centrifugal compressor of claim 3, wherein the at least some of the lugs include at least one of a bolt connected to the shroud, and a lug integral to the shroud.

5. The gas turbine centrifugal compressor of claim 4, wherein the shroud includes a low pressure portion defining at least in part an inlet to the centrifugal compressor and a high pressure portion defining at least in part an outlet from the centrifugal compressor, and the at least some of the lugs extend from the high pressure portion.

6. The gas turbine centrifugal compressor of claim 5, wherein the shroud is dimensioned such that during at least part of a time during which the shroud assembly is in use, each lug of the at least some of the lugs and a corresponding slot of the at least some of the slots define a gap between that lug and that slot, the dimension is a length, and the gap is at a radially outer end of the length of that slot, the gap changing in size during thermal growth of the case portion relative to the shroud.

7. The gas turbine centrifugal compressor of claim 1, wherein the lugs and the slots are configured to allow for thermal growth of the case while maintaining the shroud coaxial with the rotation axis when a shroud assembly is in use.

8. The gas turbine centrifugal compressor of claim 1, wherein a case portion is part of the case of the centrifugal compressor, and a shroud assembly including a biasing member disposed between the shroud and the rest of the case and biasing the shroud against the case portion.

9. The gas turbine centrifugal compressor of claim 1, wherein the shroud is made of Greek Ascoloy.

10. A gas turbine engine, comprising: in serial flow communication, a compressor section and a turbine section rotatable about a rotation axis, the compressor section including:
a centrifugal rotor rotatable about the rotation axis and having blades extending generally radially from a hub, the rotor supported within a case;
a shroud disposed around the blades; and
a plurality of slots and mating lugs connecting the case to the shroud configured to allow for relative movement of the case and shroud in at least one of: an axial direction, and a radial direction in response to thermal growth within the compressor section, the plurality of slots defined by one of the shroud and the case, the mating lugs defined by the other of the shroud and the case, the shroud supported radially relative to the rotation axis by an engagement of the mating lugs in the plurality of slots.

11. The gas turbine engine of claim 10, wherein each given lug abuts at least one of two opposed lateral sides of a corresponding one of the slots to slide relative to the two opposed lateral sides in the at least one of: the radial direction and the axial direction during thermal expansion of the case.

12. The gas turbine engine of claim 11, wherein the lugs include at least one of lugs and bolts extending in the other one of: the axial direction, and the radial direction.

13. The gas turbine engine of claim 12, wherein the shroud is made of Greek Ascoloy.

14. The gas turbine engine of claim 13, further comprising a biasing member biasing the shroud against a portion of the case.

15. A method of constructing a gas compressor having centrifugal flow blades rotatable about a rotation axis, comprising:
defining a plurality of lugs on one of a case portion and a shroud of the gas compressor;
defining a plurality of slots in the other one of the case portion and the shroud of the gas compressor for sliding fit with corresponding ones of the lugs in at least one of: a radial direction and an axial direction;
inserting the lugs into corresponding ones of the slots such that the shroud is supported radially relative to the rotation axis by an engagement of the plurality of lugs in the plurality of slots;
disposing the case portion and the shroud at least in part over at least some of the centrifugal flow blades coaxially with the rotation axis to define an airflow path through the gas compressor; and
engaging the case portion and the shroud with a rest of the gas compressor.

16. The method of claim 15, comprising biasing the shroud against the case portion.

17. The method of claim 15, comprising sizing, positioning and orienting the slots relative to the lugs to allow the slots to move relative to the lugs during thermal growth of a core portion while applying substantially no pushing forces to the lugs in a radial direction.

18. The method of claim 17, comprising sizing, positioning and orienting the slots relative to the lugs to engage the lugs with surfaces defining the slots in a circumferential direction when the lugs are inserted into corresponding ones of the slots to thereby prevent rotation of the shroud about the rotation axis.

* * * * *